(12) United States Patent
Tsuji et al.

(10) Patent No.: US 8,500,617 B2
(45) Date of Patent: Aug. 6, 2013

(54) METHOD FOR MANUFACTURING EXTRACTION BAG SHEET

(75) Inventors: Yoshiyuki Tsuji, Osaka (JP); Masahiro Sunada, Toyama (JP); Hiroshi Yamaguchi, Toyama (JP)

(73) Assignees: Tsubakimoto Kogyo Co., Ltd., Osaka (JP); Fabrica Toyama Corporation, Osaka (JP)

( * ) Notice: Subject to any disclaimer, the term of this patent is extended or adjusted under 35 U.S.C. 154(b) by 396 days.

(21) Appl. No.: 12/920,365

(22) PCT Filed: May 20, 2008

(86) PCT No.: PCT/JP2008/059255
§ 371 (c)(1),
(2), (4) Date: Aug. 31, 2010

(87) PCT Pub. No.: WO2009/141870
PCT Pub. Date: Nov. 26, 2009

(65) Prior Publication Data
US 2011/0047937 A1    Mar. 3, 2011

(51) Int. Cl.
*B31B 1/86* (2006.01)

(52) U.S. Cl.
USPC ........... 493/375; 493/221; 493/226; 493/941; 53/134.2; 53/413; 53/414

(58) Field of Classification Search
USPC . 493/375, 376, 221, 226, 941, 946; 53/134.1, 53/134.2, 413, 414
See application file for complete search history.

(56) References Cited

U.S. PATENT DOCUMENTS

| | | | | |
|---|---|---|---|---|
| 5,312,318 A * | 5/1994 | Vernon et al. | | 493/194 |
| 5,399,224 A * | 3/1995 | Vernon et al. | | 156/324 |
| 5,580,408 A * | 12/1996 | Vernon et al. | | 156/176 |
| 5,689,936 A * | 11/1997 | Kenney | | 53/413 |
| 5,951,452 A * | 9/1999 | Stevenson | | 493/193 |
| 6,453,639 B1 * | 9/2002 | Sgubbi | | 53/134.2 |
| 6,807,793 B1 * | 10/2004 | Romagnoli | | 53/134.2 |
| 7,204,794 B2 * | 4/2007 | Rea et al. | | 493/375 |

(Continued)

FOREIGN PATENT DOCUMENTS

| | | |
|---|---|---|
| JP | A-10-157709 | 6/1998 |
| JP | A-11-077860 | 3/1999 |
| JP | A-2004-255742 | 9/2004 |
| JP | A-2006-510550 | 3/2006 |

OTHER PUBLICATIONS

International Search Report issued in Application No. PCT/JP2008/059255; Dated Jul. 15, 2008 (With Translation).

*Primary Examiner* — Thanh Truong
(74) *Attorney, Agent, or Firm* — Oliff & Berridge, PLC

(57) ABSTRACT

A method of manufacturing an extraction bag sheet including: (1) a step of placing and holding tags on a rotary supporting body at predetermined intervals; (2) threading a string into a continuous pattern on the circumferential surface of the rotary supporting body; (3) bonding the string to the tags; (4) supplying a water-permeable filter sheet onto the tags and the string; (5) bonding the water-permeable filter sheet to the string; and (6) bonding the water-permeable filter sheet to the tags. In the bonding steps of (3), (5), and (6), bonding heads are used which are moved reciprocally and oscillatingly about the center axis of the rotary supporting body and moved vertically relative to the circumferential surface of the rotary supporting body by an oscillation servo motor and a vertical movement servo motor.

2 Claims, 11 Drawing Sheets

U.S. PATENT DOCUMENTS

2002/0005027 A1* 1/2002 Lohrey et al. .................. 53/413
2005/0118303 A1 6/2005 Rea et al.
2011/0005172 A1* 1/2011 Miyahara et al. ............... 53/455

* cited by examiner (a)

(b)

METHOD FOR MANUFACTURING EXTRACTION BAG SHEET

TECHNICAL FIELD

The present invention relates to a string threading apparatus used to manufacture an extraction bag sheet and to a machine for manufacturing an extraction bag sheet using the string threading apparatus.

BACKGROUND ART

Commonly used extraction bags include tea bags for black teas, green teas, herbal teas, and other teas and extraction bags containing dried products such as dried small sardine and dried bonito for preparing stock. Such an extraction bag includes: a bag body having a flat, tetrahedral, or other shape and made of a water-permeable filter sheet such as a non-woven fabric sheet; an extractable material, such as tea leaves, packed in the bag body; and a hanging string with a tag that is attached to the outer surface of the bag body.

In one known extraction bag sheet used to manufacture such extraction bags, hanging strings each having a tag for a single extraction bag are disposed on a strip-like water-permeable filter sheet at predetermined intervals in the lengthwise direction of the sheet (Patent Document 1). In another known extraction bag sheet that is designed to be manufactured with improved productivity, tags are disposed on a strip-like water-permeable filter sheet at predetermined intervals in the lengthwise direction of the sheet, and a long string is disposed in a specific convolution pattern so as to be placed on each tag (Patent Document 2).

[Patent Document 1] Japanese Patent Application Laid-Open No. Hei 10-157709
[Patent Document 2] Published Japanese Translation of PCT International Application No. 2006-510550

DISCLOSURE OF THE INVENTION

Problems to be Solved by the Invention

A method for manufacturing the above extraction bag sheet includes disposing the tags on the strip-like water-permeable filter sheet at predetermined intervals in the lengthwise direction of the sheet, and disposing the long string in a specific convolution pattern so as to be placed on each tag. The method further includes: a bonding step of, after the tags are placed and held on a rotary supporting body at predetermined intervals and the long string is disposed in the specific convolution pattern so as to be placed on each tag, bonding the long string to the tags; and another bonding step of, after the water-permeable filter sheet is supplied onto the rotary supporting body, bonding the water-permeable filter sheet to the strip or the tags on the rotary supporting body. In the conventional manufacturing method (Patent Document 2), a plurality of bonding units used in the above bonding steps are moved vertically relative to the circumferential surface of the rotary supporting body using a cam mechanism driven by a common driving source shared with the rotary supporting body.

However, with the above mechanism, the speeds of the vertical movements of the bonding units and the time period of press-contact with the circumferential surface of the rotary supporting body cannot be adjusted freely. Therefore, unfortunately, when the production rate of the extraction bag sheet is changed or when the materials for the bonding objects such as the tags, string, and water-permeable filter sheet are changed, the bonding conditions cannot be optimized.

In view of the foregoing, it is an object of the present invention to enable the tags, string, and water-permeable filter sheet to be bonded under optimal conditions suitable for the materials for these parts and the production rate of the extraction bag sheet.

Means for Solving the Problems

The present inventor has found that the above object can be achieved by moving a bonding unit for bonding a string to a tag on a rotary supporting body vertically relative to the circumferential surface of the rotary supporting body and oscillatingly according to the rotation of the rotary supporting body, and controlling the vertical movement and the oscillating movement by servo motors. Preferably, in addition to the above bonding unit, a bonding unit for bonding the string to a water-permeable filter sheet and a bonding unit for bonding the tag to the water-permeable filter sheet are moved vertically and oscillatingly.

Accordingly, the present invention provides a method for manufacturing an extraction bag sheet, the extraction bag sheet being a water-permeable filter sheet on which tags bonded to a string are disposed at predetermined intervals in a lengthwise direction of the water-permeable filter sheet, the method including:

(1) a step of placing and holding the tags on a rotary supporting body at predetermined intervals;
(2) a threading step of threading the string into a continuous pattern by moving a threading member oscillatingly on a circumferential surface of the rotary supporting body having threading pins protruding from the circumferential surface;
(3) a bonding step of bonding the string to the tags;
(4) a step of supplying the water-permeable filter sheet onto the tags and the string placed on the rotary supporting body;
(5) a bonding step of bonding the string to the water-permeable filter sheet on the rotary supporting body; and
(6) a bonding step of bonding the tags to the water-permeable filter sheet on the rotary supporting body, wherein, in the bonding steps of (3), (5), and (6), bonding heads that are moved oscillatingly about a center axis of the rotary supporting body and moved vertically relative to the circumferential surface of the rotary supporting body are used, and oscillation speeds, vertical movement speeds, and press-contact time periods of the bonding heads are controlled using an oscillation servo motor and a vertical movement servo motor.

The present invention also provides a machine that embodies the above method for manufacturing an extraction bag sheet. More specifically, the invention provides a machine for manufacturing an extraction bag sheet, the extraction bag sheet being a water-permeable filter sheet on which tags bonded to a string are disposed at predetermined intervals in a lengthwise direction of the water-permeable filter sheet, the machine including:

(1) a tag supplying unit for supplying the tags onto a rotary supporting body such that the tags are held thereon at predetermined intervals;
(2) a string threading unit for threading the string into a continuous pattern by moving a threading member oscillatingly on a circumferential surface of the rotary supporting body having threading pins protruding from the circumferential surface;
(3) a bonding unit for bonding the string to the tags;
(4) sheet supplying means for supplying the water-permeable filter sheet onto the tags and the string placed on the rotary supporting body;

(5) a bonding unit for bonding the string to the water-permeable filter sheet on the rotary supporting body; and (6) a bonding unit for bonding the tags to the water-permeable filter sheet on the rotary supporting body, wherein each of the bonding units in (3), (5), and (6) includes a bonding head that is moved oscillatingly about a center axis of the rotary supporting body and moved vertically relative to the circumferential surface of the rotary supporting body, and oscillation speeds, vertical movement speeds, and press-contact time periods of the bonding heads of the bonding units in (3), (5), and (6) are controlled using an oscillation servo motor and a vertical movement servo motor.

Effects of the Invention

In the method and apparatus for manufacturing an extraction bag sheet according to the present invention, the bonding unit for bonding the string to the tags on the rotary supporting body is moved vertically relative to the circumferential surface of the rotary supporting body and oscillatingly according to the rotation of the rotary supporting body, and the vertical movement and the oscillating movement are controlled by the servo motors. Preferably, in addition to the above bonding unit, the bonding unit for bonding the string to the water-permeable filter sheet and the bonding unit for bonding the tags to the water-permeable filter sheet are moved vertically and oscillatingly.

Therefore, these bonding units can be freely adjusted in their speed and timing of the vertical movement relative to the circumferential surface of the rotary supporting body and in their speed in the rotation direction of the rotary supporting body, returning speed in the direction opposite to the rotation direction, and oscillation timing when they are oscillatingly moved together with the rotary supporting body. Accordingly, when ultrasonic bonding is employed and also when heat bonding is employed, each bonding unit can be brought into press-contact with the circumferential surface of the rotary supporting body for a period of time necessary for obtaining a predetermined bonding strength, during the movement of the bonding unit in the rotation direction of the rotary supporting body. When each bonding unit returns in the direction opposite to the rotation direction of the rotary supporting body, the bonding unit can be moved at a high speed according to the production rate of the extraction bag sheet.

Therefore, the bonding of the tags, string, and water-permeable filter sheet can be performed under optimal conditions suitable for these materials and the production rate of the extraction bag sheet, so that the production rate can be improved.

In conventional cases, in particular when heat bonding is employed, the temperature condition for the heat bonding must be changed according to the materials for the heat bonding objects and the production rate. However, according to the present invention, the bonding conditions can be adjusted by changing the press-contact time period. Therefore, the bonding conditions can be adjusted more easily.

Figure 1A:
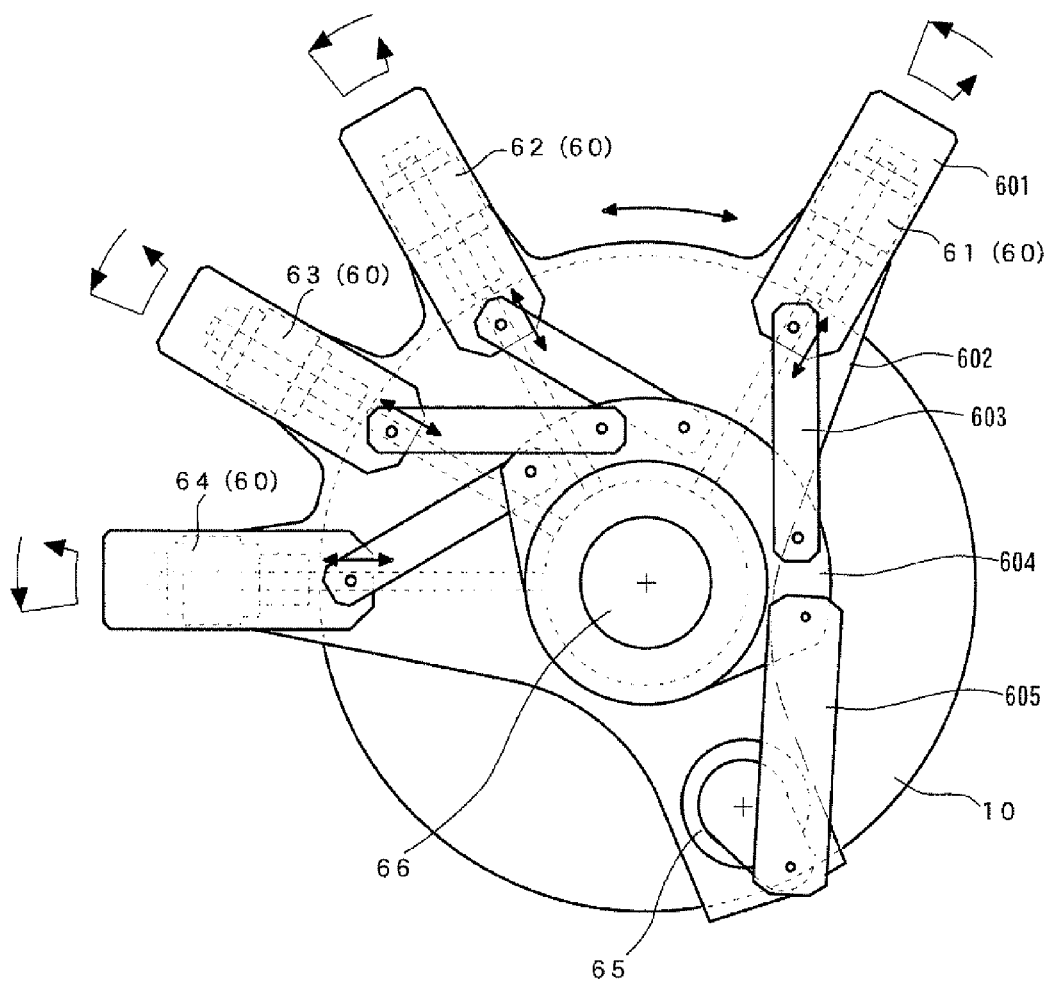
FIG. 1A is a rear view of bonding units in an embodiment.

DESCRIPTION OF REFERENCE NUMERALS 1 extraction bag sheet manufacturing machine
2 tag
2r tag tape roll
2t tag tape
3 string
3r string spool
4 water-permeable filter sheet
4r sheet roll
5 extraction bag sheet
6 extraction bag
10 rotary supporting body
   101 spring
   102 fixed cam
11, 11a, 11b, 11c, 11d pin
12 servo motor for rotary supporting body
13a, 13b, 13c, 13d gear
20 tag supplying unit
21 tag cutting-supplying unit
22 tag delivery drum
30 string threading unit
31 joint portion
32a first driving crank mechanism
32b second driving crank mechanism
33Ma, 33Mb servo motor
34a, 34b crank arm
35a, 35b link
36 string guide
37 threading member
38 threading member holding bracket
40 string threading mechanism
   401 driving roller
   402 nip roller
   410 tension adjusting means for string
   420 dancer mechanism
   422 servo motor
   430 pass length adjusting unit
50 sheet supplying unit
51 dancer roller
52 nip driving roller
60 bonding unit
61 first bonding unit
62 second bonding unit
63 third bonding unit
64 fourth bonding unit
65 bonding head vertically driving servo motor
66 bonding head oscillation servo motor for
   601 bonding head attaching plate
   602 oscillation plate
   603 rod link 604 vertical moving plate
605 rod link
606 air cylinder
70 packing-packaging machine
71 standard feeding roller
72 forming guide
73 tubular body
74 feeding roller
75 vertical bonding unit
76 horizontal bonding unit
76a bonding head
76b receiving portion for bonding head
77 scrap rolling means
80 auger feeder
La trajectory of threading member relative to pin
Lb trajectory of threading member in fixed coordinate system
P1 rotation axis of tag delivery drum
P2 oscillation driving crank shaft of tag supplying unit
P3 driving crank shaft of cutter
θa, θb oscillation angle of crank arm
s1, s2, s3, s4 bonded area

BEST MODE FOR CARRYING OUT THE INVENTION

Hereinafter, the present invention will be specifically described with reference to the drawings. In the drawings, the same reference numerals denote the same or similar elements.

Figure 1B:
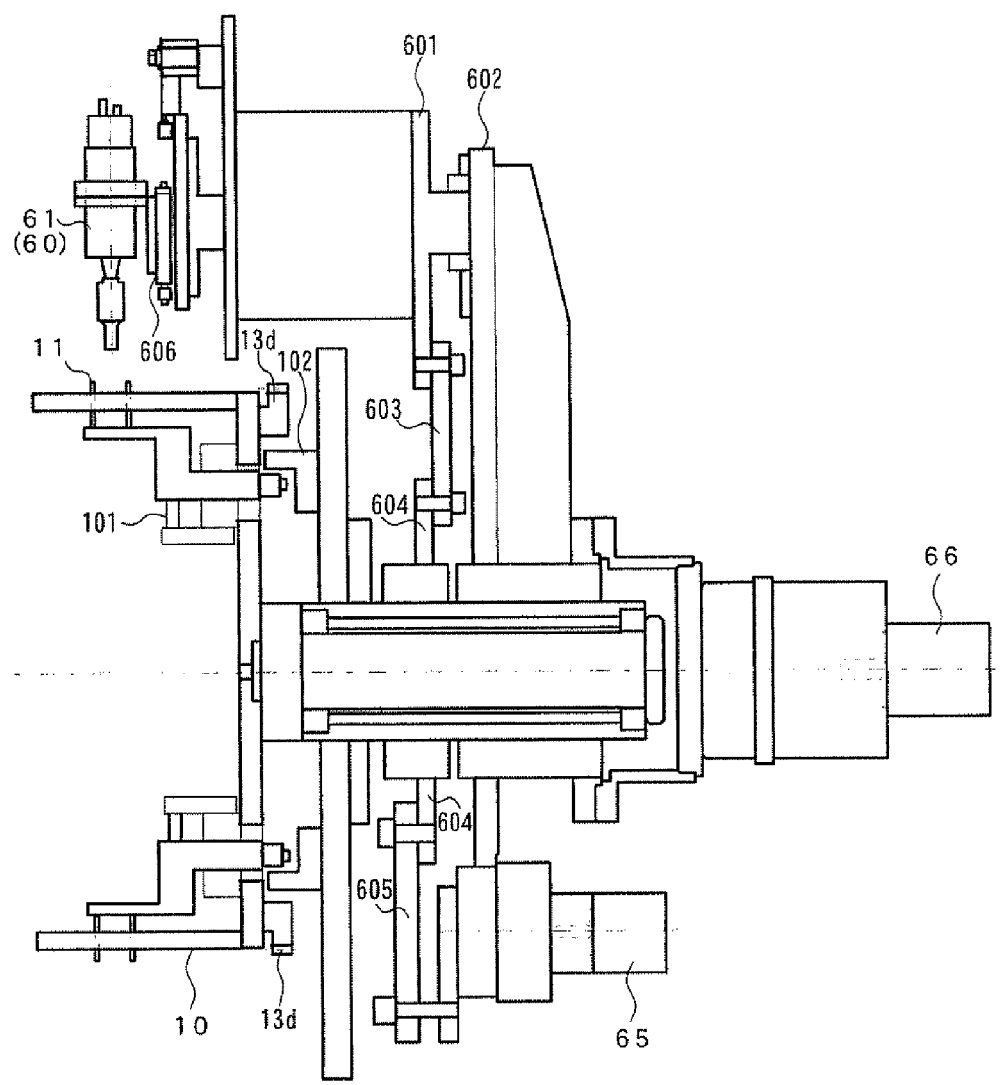
FIG. 1B is a cross-sectional view of the bonding units in the embodiment.
Figure 1C:
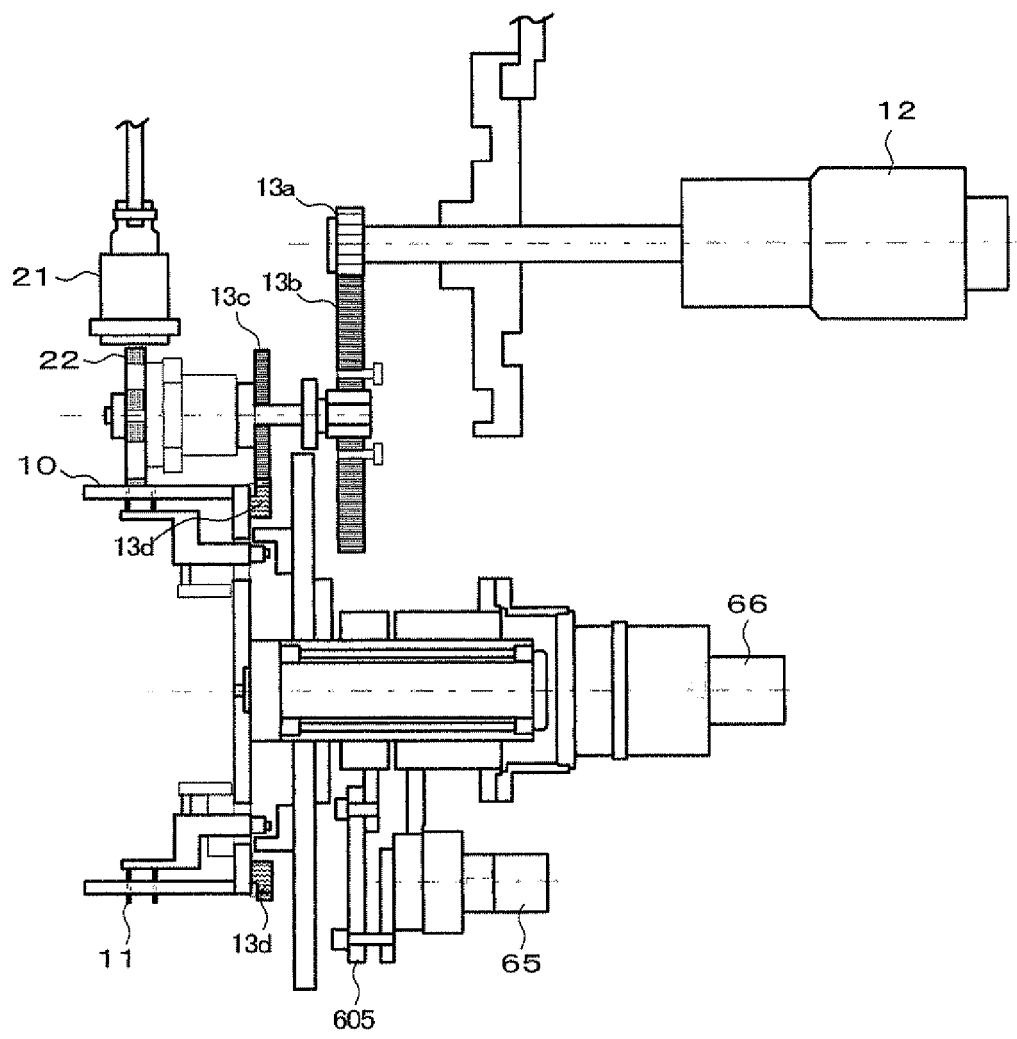
FIG. 1C is another cross-sectional view of the bonding units in the embodiment.
Figure 2:
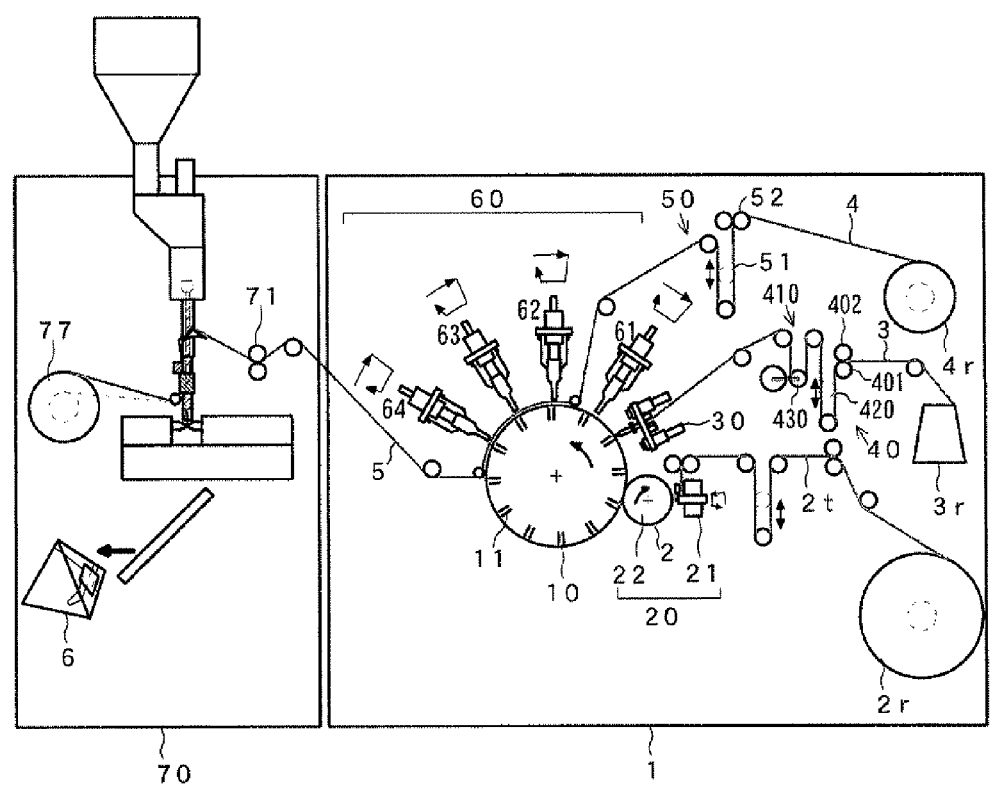
FIG. 2 is a schematic configuration diagram of a machine for manufacturing an extraction bag sheet in the embodiment.

FIG. 1A is a rear view of bonding units 60 used in an embodiment of the present invention. FIG. 1B is a vertical cross-sectional view thereof, and FIG. 1C is a horizontal cross-sectional view thereof. FIG. 2 is a configuration diagram of an extraction bag sheet manufacturing machine 1 having the bonding units 60 installed therein.

In general, this extraction bag sheet manufacturing machine 1 includes: a tag supplying unit 20 for supplying tags 2 onto the circumferential surface of a rotary supporting body 10 at predetermined intervals; a string threading mechanism 40; a sheet supplying unit 50 for supplying a water-permeable filter sheet 4 onto the tags 2 and a string 3 placed on the rotary supporting body 10; and the bonding units 60 for bonding the tags 2 to the string 3, the tags 2 to the water-permeable filter sheet 4, and the string 3 to the water-permeable filter sheet 4.

A packing-packaging machine 70 is provided downstream of the extraction bag sheet manufacturing machine 1. In the packing-packaging machine 70, pyramid-shaped bags are formed from an extraction bag sheet 5 manufactured in the extraction bag sheet manufacturing machine 1, and a product such as tea leaves is packed in the pyramid-shaped bags to produce extraction bags 6.

In the manufacturing machine 1, the rotary supporting body 10 is driven by a servo motor 12 for the rotary supporting body through gears 13a, 13b, 13c and 13d (see FIG. 1C) and rotated continuously in a direction of an arrow in FIG. 2 when the manufacturing machine 1 is in operation.

The outer circumference of the rotary supporting body 10 is divided into 24 sections, and each section has a placement area for a tag 2 in such a way that pairs of close placement areas are provided sequentially. A mechanism for holding a tag 2 by suction using a vacuum pump or a blower motor is provided in each placement area for the tag 2. More specifically, the suction against the tag 2 is started at a position facing the tag supplying unit 20 and stopped at a position between a position at which the tag 2 is weakly bonded to the water-permeable filter sheet 4 (by a fourth bonding unit 64, described later) and a position at which the extraction bag sheet is separated from the circumferential surface of the rotary supporting body 10. The suction is started and stopped by changing a suction passage by a rotary valve.

The rotary supporting body 10 also includes a mechanism for vertically moving string-threading pins 11. This vertical movement mechanism is configured such that the pins 11 are always urged by springs 101 so as to protrude from the circumferential surface of the rotary supporting body. However, in a region where the water-permeable filter sheet 4 is supplied onto the circumferential surface of the rotary supporting body 10, the pins 11 are moved downwardly toward the inside of the rotary supporting body along the shape of a fixed cam 102 disposed inside the rotary supporting body 10 so that only small portions of the pins 11 protrude from the circumferential surface.

The tag supplying unit 20 includes: a tag cutting-supplying unit 21 for unwinding tag tape 2t from a tag tape roll 2r being a roll of the tag tape 2t and cutting the unwound tag tape 2t into individual tags 2 having a predetermined length; and a tag delivery drum 22 that transfers the tags 2 cut in the tag cutting-supplying unit 21 onto the circumferential surface of the rotary supporting body 10.

The tag supplying unit 20 is designed such that the tags 2 can be supplied from the tag tape roll 2r to the rotary supporting body 10 as fast as possible without slack of the tag tape 2t. More specifically, the tag tape 2t is cut while the tag cutting-supplying unit 21 is oscillatingly moved by a cam mechanism as shown by arrows, and the cut tugs 2 are sent to the tag delivery drum 22. The tag delivery drum 22 is rotated at constant speed so that the tags 2 sent from the tag cutting-supplying unit 21 are held on the rotary supporting body 10 at predetermined intervals.

The string threading mechanism 40 is designed such that, while the tension of the string 3 is adjusted to be substantially constant, a continuous convolution pattern of the string 3 that overlaps each tag 2 at least one point is formed on the circumferential surface of the rotary supporting body 10 having the tags 2 disposed thereon at predetermined intervals. The string threading mechanism 40 includes: a driving roller 401 for unwinding the string 3 from a string spool 3r; a nip roller 402 facing the driving roller 401; tension adjusting means 410 for the string 3; and a string threading unit 30 for forming the continuous convolution pattern of the string 3 on the circumferential surface of the rotary supporting body 10. The tension adjusting means 410 includes a dancer mechanism 420 and a pass length adjusting unit 430 disposed downstream of the dancer mechanism 420.

Figure 3:
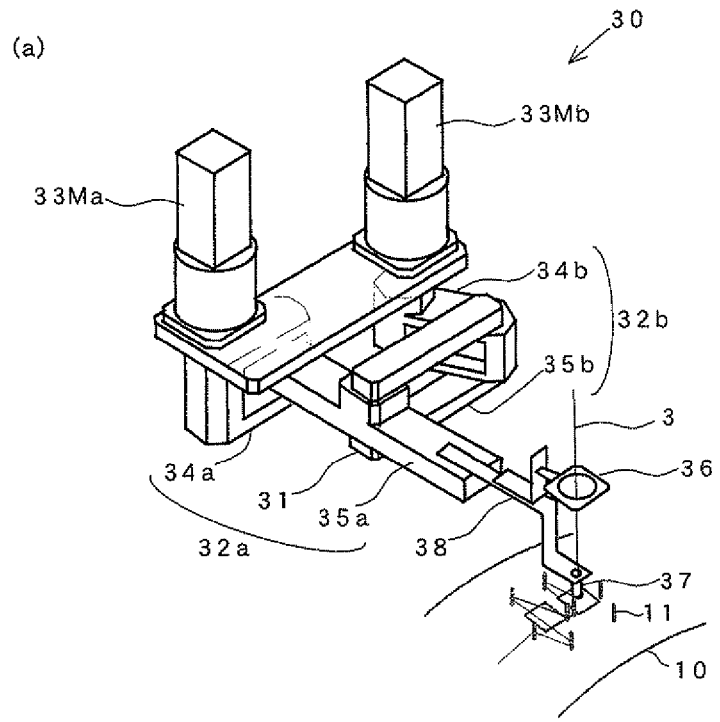
FIG. 3(a) is a perspective view of a string threading unit.
FIG. 3(b) is a top view thereof.
Figure 3:
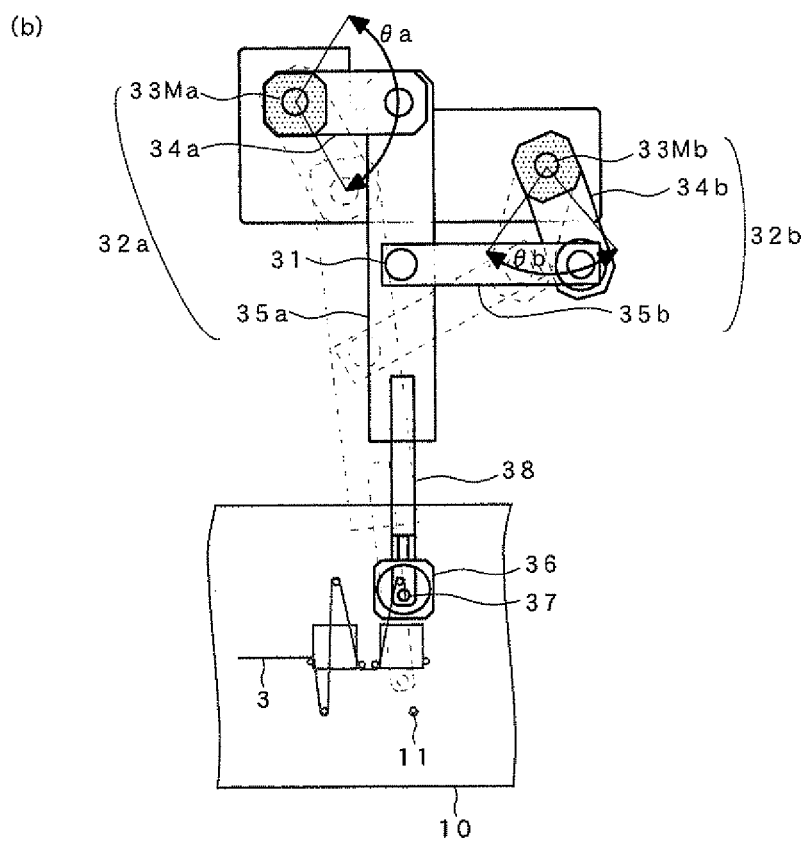

The string threading unit 30 includes a first driving crank mechanism 32a and a second driving crank mechanism 32b connected substantially perpendicularly to each other at a joint portion 31, as shown in FIG. 3. The driving crank mechanisms 32a and 32b respectively include crank arms 34a and 34b driven by servo motors 33Ma and 33Mb, respectively, and links 35a and 35b connected to the crank arms 34a and 34b, respectively. The joint portion 31 of the first driving crank mechanism 32a and the second driving crank mechanism 32b connects the mid portion of the link 35a of the first driving crank mechanism 32a to the end portion of the link 35b of the second driving crank mechanism 32b. A threading member holding bracket 38 including a ring-shaped string guide 36 and a threading member 37 is disposed at the end portion of the link 35a of the first driving crank mechanism 32a.

In the above configuration, the joint portion 31 of the first driving crank mechanism 32a and the second driving crank mechanism 32b is disposed at the mid portion of the link 35a of the first driving crank mechanism 32a. This can prevent the sliding members that serve as dust generating sources, such as the joint portion 31 and a joint portion of the crank arm 34b and the link 35b, from being positioned over the circumferential surface of the rotary supporting body 10. Moreover, only the threading member holding bracket 38 is positioned over the circumferential surface of the rotary supporting body 10, and the links are positioned off the circumferential surface. This can minimize possible obstacles when the string is threaded and the water-permeable filter sheet is supplied onto the rotary supporting body 10.

In the string threading unit 30, the threading member holding bracket 38 is driven by the two driving crank mechanisms 32a and 32b. Since the servo motors 33Ma and 33Mb are used as the driving sources of the driving crank mechanisms 32a and 32b, respectively, the threading member 37 can be moved along a trajectory necessary for threading.

Figure 4:
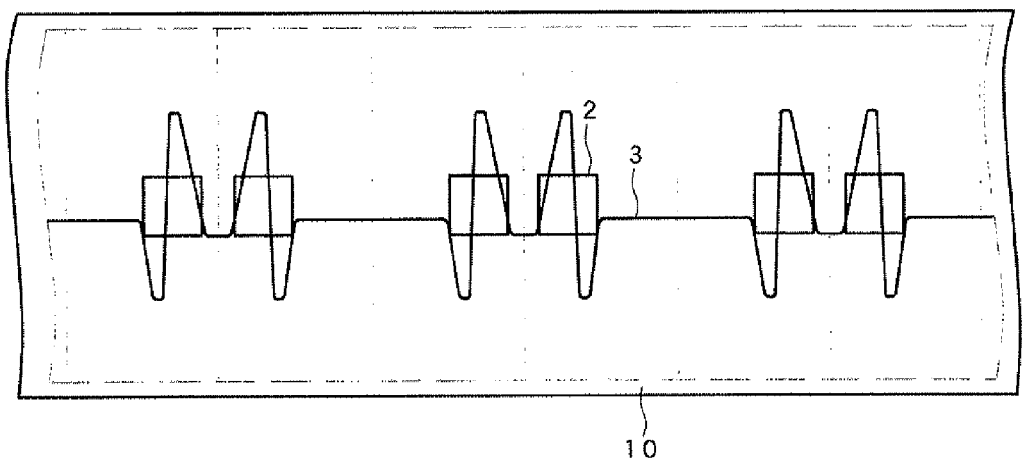
FIG. 4 is a plan view of a continuous pattern of a string formed on the circumferential surface of a rotary supporting body.
Figure 5:
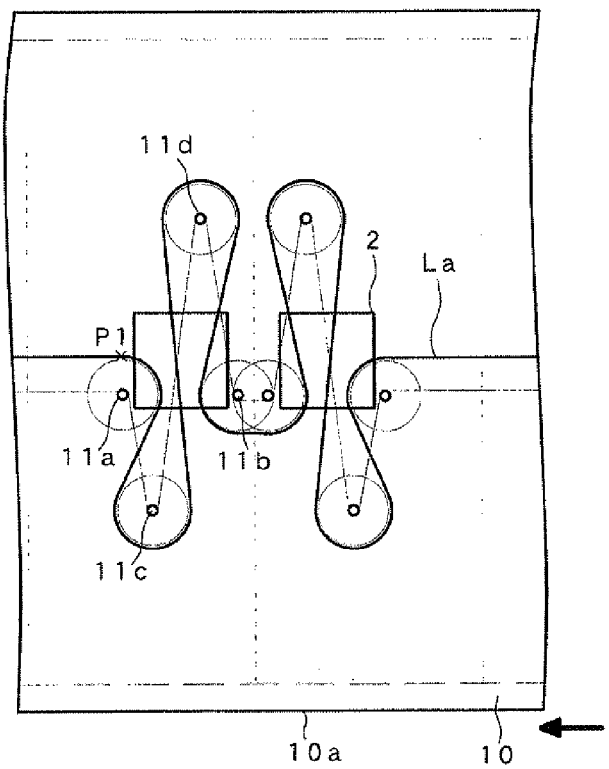
FIG. 5 is a diagram illustrating the trajectory of a threading member on the circumferential surface of the rotary supporting body.

More specifically, for example, when the paired tags 2 secured by suction to the circumferential surface of the rotary supporting body 10 are arranged as close pairs disposed at predetermined intervals as shown in FIG. 4, a continuous pattern of the string 3 that is elongated on each tag 2 in the axial direction of the rotary supporting body can be formed in the manner described below. When the string is threaded, threading pins 11a and 11b are protruding, and threading pins 11c and 11d are also protruding. The threading pins 11a and 11b are disposed on opposite sides (the upstream and downstream sides of the rotation direction of the rotary supporting body 10) of each tag 2 and located at positions spaced apart from the center toward one circumferential edge 10a of the rotary supporting body 10, as shown in FIG. 5. The threading pins 11c and 11d are disposed at positions spaced apart from each tag 2 in the axial direction of the rotary supporting body 10. The string threading unit 30 is moved such that the threading member 37 at the end of the threading member holding bracket 38 travels around the pins 11 (11a, 11b, 11e, and 11d) along circular trajectories having a predetermined radius (for example, 6 to 10 mm) and travels between the pins 11 along tangential lines of the circular trajectories. In FIGS. 4 and 5, broken lines represent the water-permeable filter sheet 4 to be supplied subsequently onto the circumferential surface of the rotary supporting body 10, and dotted lines represent a section of each single extraction bag in the water-permeable filter sheet 4. In FIG. 5, the continuous convolution pattern represented by a thin line corresponds to the continuous convolution pattern shown in FIG. 4.

Figure 6:
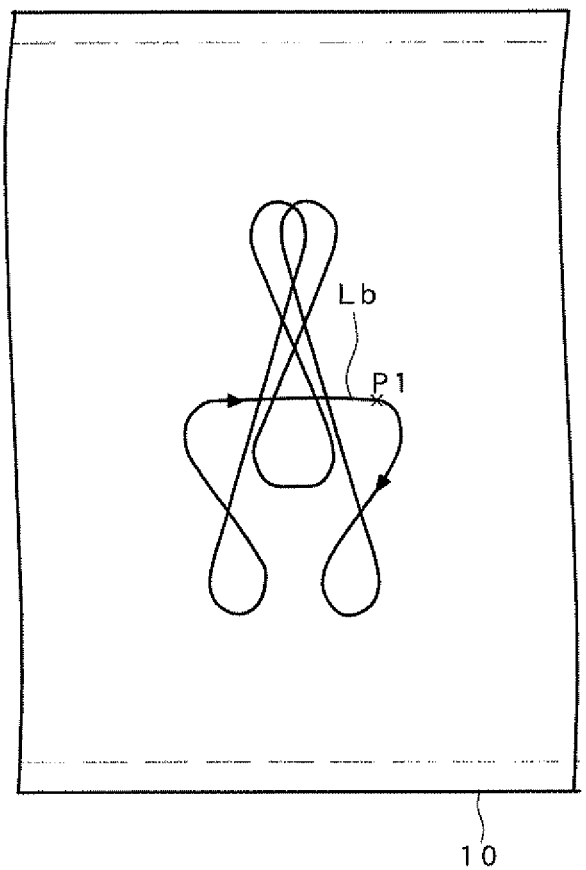
FIG. 6 is a diagram illustrating the trajectory of the threading member in a fixed coordinate system.

A trajectory La shown in FIG. 5 is a trajectory relative to the pins 11 moving in the direction of an arrow with the rotation of the rotary supporting body 10. Therefore, the string threading unit 30 is moved such that the threading member 37 travels along a trajectory Lb shown in FIG. 6 in a fixed coordinate system. Reference symbol P1 in FIGS. 5 and 6 represents the same point on the trajectories La and Lb.

The above movement of the threading member 37 can be achieved by actuating the servo motors 33Ma and 33Mb to generate reciprocal movements and controlling the rotation speeds and rotation periods of the motors. In this case, it is preferable to set the oscillation angles θa and θb of the crank arms 34a and 34b to 120° or less. Near the top dead centers and the bottom dead centers of the crank arms 34a and 34b, the movements of the links 35a and 35b are smaller relative to the movements of the crank arms 34a and 34b, so that it is difficult to move the threading member 37 at a predetermined speed. However, when the crank arms 34a and 34b are moved within the above range, the threading member 37 can be moved at a predetermined speed.

The movement of the threading member 37 can be controlled by the servo motors 33Ma and 33Mb, for example, in the following manners: (i) The threading member 37 is controlled so as to move at a constant speed; (ii) The threading member 37 is controlled so as to move around the pins 11 at a low speed and to move on the linear portions between the pins at a high speed; (iii) The threading member 37 is accelerated and decelerated according to a predetermined distorted curve; (iv) The unwinding rate of the string 3 from the string spool 3r having the string 3 wound thereon is controlled to be constant. Of these, the control mode (iv) is preferred because variations in tension of the string can be suppressed to be small.

The above movement of the string threading unit 30 can be controlled by actuating servo mechanisms by rotary encoders that have been installed in the servo motors 33Ma and 33Mb.

The sheet supplying unit 50 is designed such that the water-permeable filter sheet 4 is unwound from a sheet roll 4r being a roll of the water-permeable filter sheet 4 and supplied onto the tags 2 held on the rotary supporting body 10 at predetermined intervals and the string 3 placed into the continuous pattern on the tags 2. The water-permeable filter sheet 4 is unwound such that the unwinding speed is maintained as constant as possible. This can be achieved by controlling the unwinding rate with a nip driving roller 52 for unwinding the water-permeable filter sheet 4 using an angle detector attached to a dancer roller 51 in a feeding path.

Figure 7:
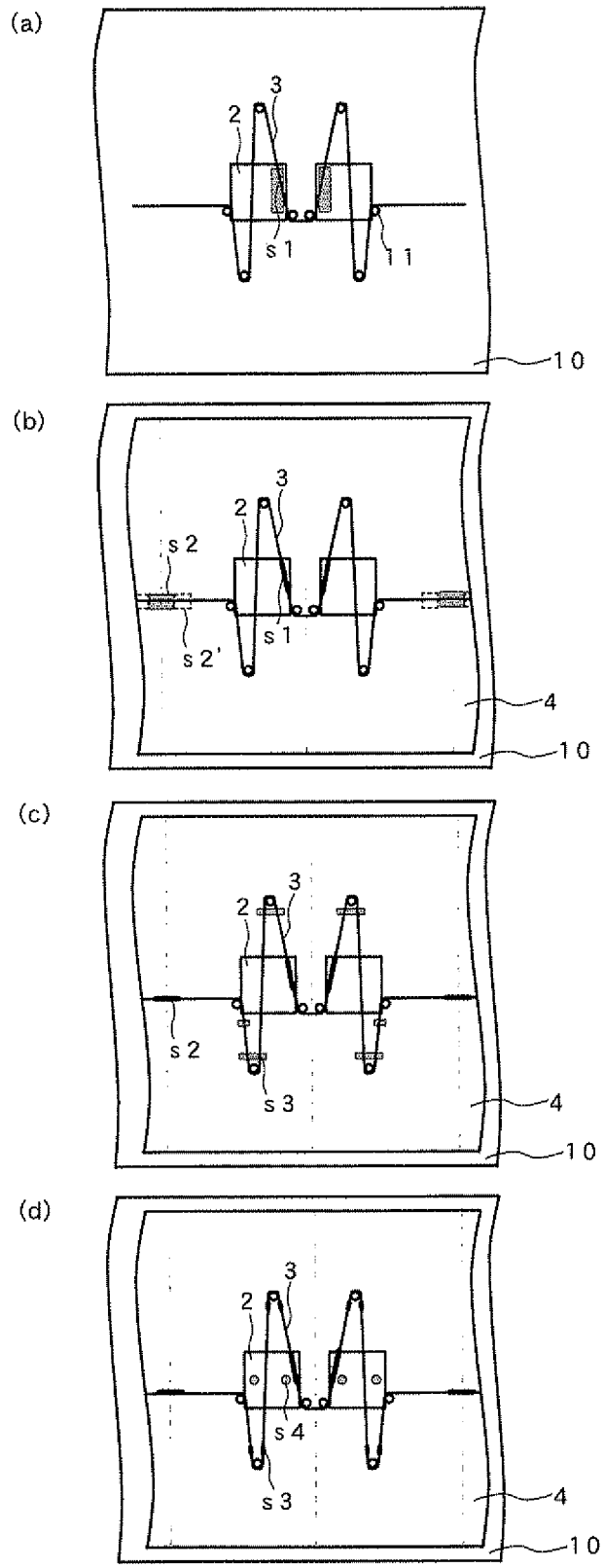
FIG. 7 is a series of diagrams illustrating bonding areas.

The bonding units 60 include first to fourth bonding units 61, 62, 63, and 64 that are driven by a control mechanism, which is a characteristic feature of the present invention. More specifically, the first bonding unit 61 is used to strongly bond the string 3 to each tag 2 held on the rotary supporting body 10 at a bonding area s1 shown in FIG. 7(a) before the water-permeable filter sheet 4 is supplied onto the rotary supporting body 10. The second bonding unit 62 is used to strongly bond the string 3 to the water-permeable filter sheet 4 at an area s2 provided for each extraction bag section and spaced apart from the tag 2 in the lengthwise direction of the water-permeable filter sheet 4, as shown in FIG. 7(b), after the water-permeable filter sheet 4 is supplied onto the rotary supporting body 10. The third bonding unit 63 is used to weakly bond the string 3 to the water-permeable filter sheet 4 at areas s3 where the string 3 is stretched from the tag 2 in the axial direction of the rotary supporting body 10, i.e., the width direction of the water-permeable filter sheet 4, as shown in FIG. 7(c). The fourth bonding unit 64 is used to weakly bond each tag 2 to the water-permeable filter sheet 4 at bonding areas s4 shown in FIG. 7(d). The expression "strongly bond" means that bonding objects are strongly bonded at a bonding area to the extent that the bonded objects are not separated under normal use of the extraction bag. The expression "weakly bond" means that bonding objects are bonded at a bonding area to the extent that the bonded objects can be easily separated in use of the extraction bag. In the figures, hatched frames surrounding the bonding areas s1, s2, s3, and 54 represent areas on which bonding heads press-contact.

In the extraction bag sheet manufacturing machine 1 of the present invention, the bonding areas may be appropriately changed according to the convolution pattern of the string 3, the arrangement of the pins 11, and the like. For example, the bonding area s2 at which the string 3 is strongly bonded to the water-permeable filter sheet 4 may be moved from the boundary region between two extraction bag sections to a bonding area s2' represented by a dashed line in FIG. 7(b) so as to be located closer to the central portion of the single extraction bag section. Alternatively, the bonding at the bonding area s2 in the boundary region between two extraction bag sections may be performed as bonding in the widthwise direction of the water-permeable filter sheet 4 at the time of forming a bag.

However, it is preferable that the string 3 be strongly bonded to the water-permeable filter sheet 4 at the bonding area s2 before a bag is produced because the string 3 used as a hanging string can be securely bonded to the water-permeable filter sheet 4 constituting the bag body of the extraction bag.

Bonding means used in the bonding units 60 (61, 62, 63, 64) may be ultrasonic welding or thermal welding. Ultrasonic welding is preferred because less debris of the fused sheet adheres to the bonding units.

The bonding units 60 (61, 62, 63, 64) are driven as follows. For example, as shown in FIGS. 1A and 1B, a vertical driving servo motor 65 is provided separately from the driving source for the rotary supporting body 10 and is used as a driving source for moving the bonding units 60 (61, 62, 63, 64) vertically relative to the circumferential surface of the rotary supporting body 10. In addition, an oscillation servo motor 66 is used as a driving source for oscillatingly moving the bonding units 60 (61, 62, 63, 64) reciprocally in the rotation direction of the rotary supporting body 10. In this manner, the bonding units 60 (61, 62, 63, 64) are oscillatingly moved as shown by arrows in FIG. 1A.

More specifically, bonding head attaching plates 601 to which the bonding units 61, 62, 63, and 64 are secured are attached to an oscillation plate 602 so as to be slidable in the radial direction of the rotary supporting body 10. The bonding head attaching plates 601 are connected to a vertical moving plate 604 through rod links 603, and the vertical moving plate 604 is connected through a rod link 605 to the bonding head vertically driving servo motor 65 disposed close to the driving axis of the rotary supporting body 10. The bonding units 61, 62, 63, and 64 are secured to the bonding head attaching plates 601 through air cylinders 606. The pressing force of each bonding head against the circumferential surface of the rotary supporting body 10 at a down position of the bonding head is determined by adjusting the pressure of air supplied to the air cylinder 606 to a predetermined pressure by an air regulator. The bonding heads are retracted from the circumferential surface of the rotary supporting body 10 when not pressed thereagainst, so that the bonding heads and the rotary supporting body 10 are prevented from unnecessarily wearing.

In this case, the rotation axis of the vertical moving plate 604 is common to the rotation axis of the rotary supporting body 10. However, the rotary supporting body 10 is driven by the rotary supporting body servo motor 12 disposed near the tag cutting-supplying unit 21, and the vertical moving plate 604 is driven separately from the rotary supporting body 10 by the bonding head vertically driving servo motor 65. The rotation axis of the oscillation plate 602 is also common to the rotation axis of the rotary supporting body 10. However, the oscillation plate 602 is driven separately from the rotary supporting body 10 by the bonding head oscillation servo motor 66. The driving of the bonding head vertically driving servo motor 65 and the driving of the bonding head oscillation servo motor 66 are controlled by a controller such that these servo motors are rotated at predetermined speeds in predetermined directions at predetermined timing according to the convolution pattern of the string 3, the rotation speed of the rotary supporting body 10, the time period necessary for press-contact, and the like.

By controlling the vertical movements of the bonding units 60, their vertical movement speeds, timings for starting press-contact, and timings for stopping press-contact can be controlled. By controlling the oscillating movements of the bonding units 60, their speeds in the circumferential direction of the rotary supporting body can be adjusted so as to correspond to the rotation speed of the rotary supporting body 10. In this manner, the time periods for press-contact of the bonding heads of the bonding units 60 with the bonding objects, such as the tags, the string, and the water-permeable filter sheet, can be adjusted. Therefore, even when the materials for the bonding objects are changed, optimal bonding conditions can be easily achieved. In this case, the preset oscillation output for ultrasonic bonding and the preset heating temperature for thermal bonding may be changed. However, the bonding conditions can be easily optimized by adjusting the press-contact time periods of the bonding units 60 using the vertical driving servo motor 65 and the oscillation servo motor 66 without changing the preset oscillation output and the preset heating temperature.

To manufacture the extraction bag sheet 5 using the extraction bag sheet manufacturing machine 1 of the present embodiment, first, the tag tape roll 2r, the string spool 3r, and the sheet roll 4r are installed in the machine, and the tag tape 2t is unwound from the tag tape roll 2r using the tag supplying unit 20. The unwound tag tape 2t is cut into individual tags 2, and the tags 2 are placed and held on the circumferential surface of the rotary supporting body 10 at predetermined intervals.

Next, the string threading pins 11 are caused to protrude from the circumferential surface of the rotary supporting body 10, and the string 3 are unwound from the string spool 3r using the string threading unit 30. Then the string 3 is threaded into a continuous pattern, shown in FIG. 4, on the circumferential surface of the rotary supporting body 10.

Then the string 3 is strongly bonded to each tag 2 using the first bonding unit 61, as shown in FIG. 7(a), and the water-permeable filter sheet 4 is supplied onto the tags 2 and the string 3 placed on the rotary supporting body 10 using the sheet supplying unit 50. The pins 11 that protrude from the circumferential surface of the rotary supporting body 10 when the string is threaded are pulled down when the water-permeable filter sheet 4 is supplied, so that the water-permeable filter sheet 4 is prevented from being wrinkled when the tags 2 or the string 3 is bonded to the water-permeable filter sheet 4.

Then the string 3 is strongly bonded to the water-permeable filter sheet 4 using the second bonding unit 62, as shown in FIG. 7(b). The string 3 is weakly bonded to the water-permeable filter sheet 4 using the third bonding unit 63, as shown in FIG. 7(c), and the tags 2 are weakly bonded to the water-permeable filter sheet 4 using the fourth bonding unit 64, as shown in FIG. 7(d).

Figure 8:
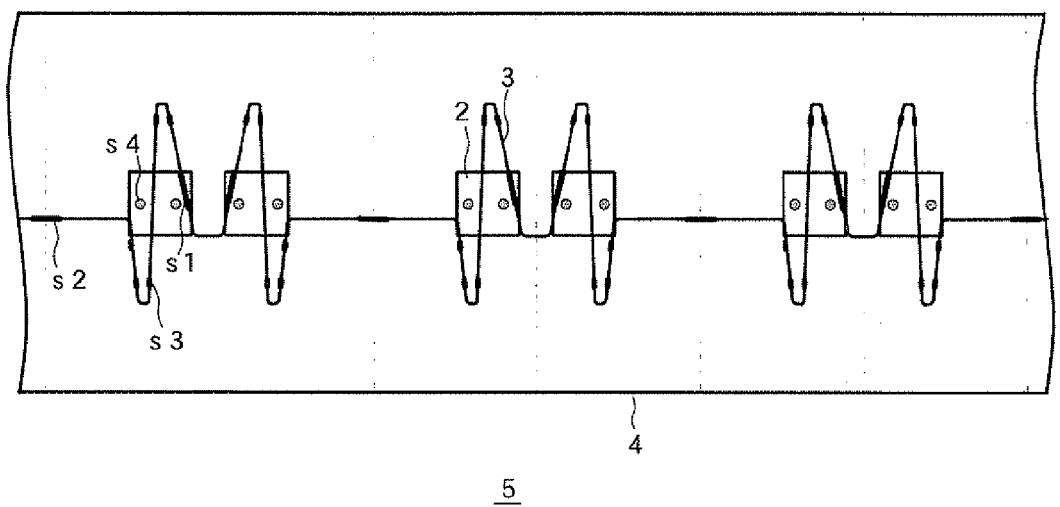
FIG. 8 is a plan view of the extraction bag sheet.

In this manner, the extraction bag sheet 5 shown in FIG. 8 is obtained on the rotary supporting body 10. In FIG. 8, s1 represents the area at which the string 3 is strongly bonded to the tag 2, and s2 represents the area at which the string 3 is strongly bonded to the water-permeable filter sheet 4. s3 represents the area at which the string 3 is weakly bonded to the water-permeable filter sheet 4, and s4 represents the area at which the tag 2 is weakly bonded to the water-permeable filter sheet 4.

The manufactured extraction bag sheet 5 may be wound into a roll and supplied to a separate packing-packaging machine to produce extraction bags. However, the manufactured extraction bag sheet 5 may be continuously sent from the rotary supporting body 10 to the packing-packaging machine 70, as shown in FIG. 2, to produce the extraction bags 6. In this case, the packing-packaging machine 70 is operated according to the speed of the extraction bag sheet 5 fed by standard feeding rollers 71 provided with a servo motor.

Figure 9:
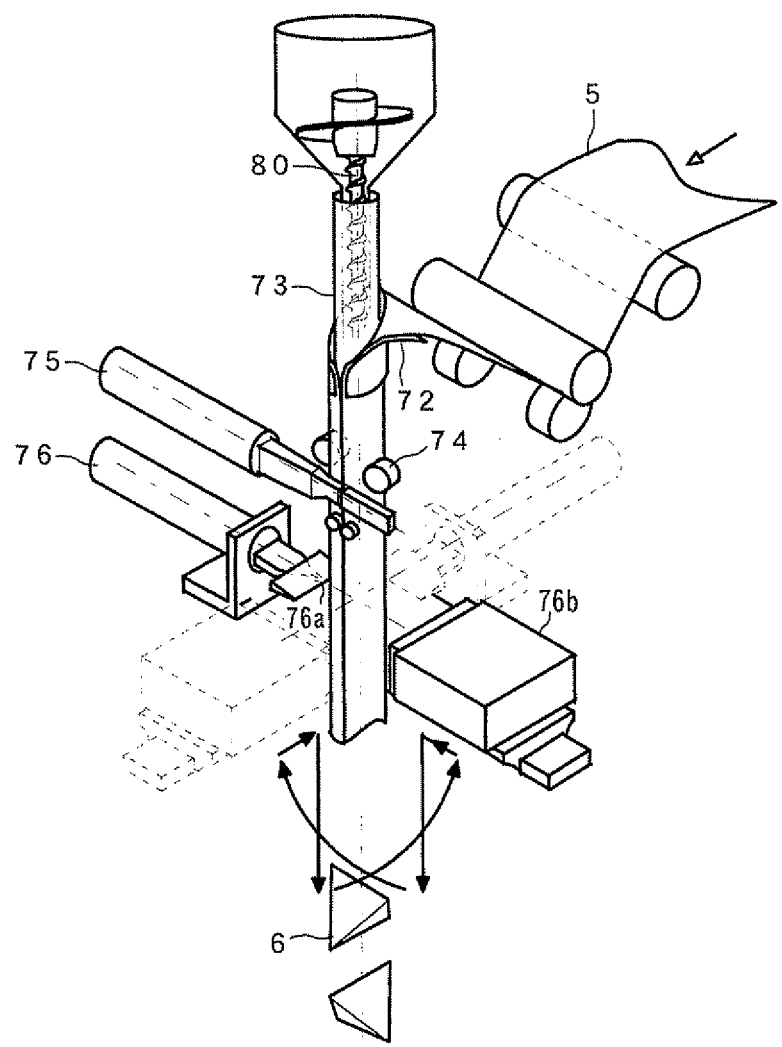
FIG. 9 is a perspective view of a packing-packaging machine.
Figure 10:
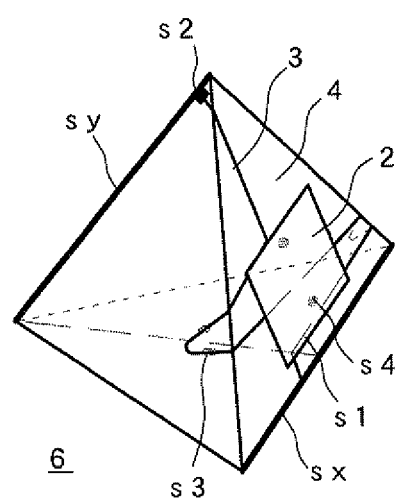
FIG. 10 is a perspective view of an extraction bag.

Any known packing-packaging machine may be used as the packing-packaging machine 70. For example, as shown in FIG. 9, the packing-packaging machine 70 includes: a tubular body 73 provided with a forming guide 72 that guides the extraction bag sheet 5; an auger feeder 80 for feeding, to the tubular body 73, a predetermined amount of a product, such as tea leaves, to be packed in each extraction bag; feeding rollers 74 for sending the extraction bag sheet 5 wound around the tubular body 73 in a downward direction; a vertical bonding unit 75 for bonding the opposite edge portions of the extraction bag sheet 5 to each other to form it into a tubular shape; and a horizontal bonding unit 76 for bonding the tubular extraction bag sheet 5 in the width direction. In the horizontal bonding unit 76, a mounting base (not shown) for a bonding head 76a is rotated stepwise by 90° in a plane perpendicular to the lengthwise direction of the tubular body 73 in an oscillating manner. The bonding head 76a is moved in the width direction of the extraction bag sheet at each oscillatory rotation movement to sequentially weld and cut the extraction bag sheet 5 in the width direction. In this manner, for example, the extraction bag 6 shown in FIG. 10 can be obtained from the extraction bag sheet 5 shown in FIG. 8. More specifically, the extraction bag 6 shown in FIG. 10 has a pyramid shape having upper and lower bonded widthwise edges sx and sy that are twisted against each other. One end of the string 3 used as a hanging string is strongly bonded to the water-permeable filter sheet 4 at the bonding area s2 located near the top of the pyramid, and the other end of the hanging string is strongly bonded to the tag 2 at the area s1. The hanging string and the tag 2 are weakly bonded to the water-permeable filter sheet 4 at areas s3 and s4, respectively.

Preferably, in the packing-packaging machine 70, the bonding head 76a of the horizontal bonding unit 76 and a receiving portion 76 therefor are moved downwardly when the extraction bag sheet is bonded in the width direction, so that the movement of the extraction bag sheet 5 is not prevented. In this case, the bonding head 76a and the receiving portion 76b of the horizontal bonding unit 76 return from the lowermost position to the original upper portion while rotated by 90°. Therefore, it is preferable to repeatedly move the horizontal bonding unit 76 as indicated by arrows in FIG. 9.

Bonding means for the vertical bonding unit 75 and bonding means for the horizontal bonding unit 76 may be ultrasonic bonding or thermal bonding.

Alternatively, a first horizontal bonding unit and a second horizontal bonding unit that have bonding directions different by 90° in a plane perpendicular to the lengthwise direction of the tubular body 73 may be used as the horizontal bonding unit 76. The first and second horizontal bonding units can be used in an alternate manner.

If an unnecessary edge portion (selvage portion) is formed when the opposite edge portions of the extraction bag sheet 5 are welded and cut using the vertical bonding unit 75, scrap rolling means 77 may be provided to roll the unnecessary edge portion.

Any conventional products may be uses as the string 3, the tag tape 2t, and the water-permeable filter sheet 4 used in the extraction bag sheet manufacturing machine 1 of the present invention. For example, any string formed of an ultrasonically weldable or thermally weldable material including thermoplastic synthetic fiber such as polypropylene or polyethylene may be used as the string 3. Any tape formed from paper, a plastic sheet, or the like may be used as the tag tape 2t. Examples of the water-permeable filter sheet 4 include paper, films having a large number of holes, and woven or nonwoven fabrics formed of single or conjugated fibers selected from synthetic fibers such as polyester, nylon, polyethylene, and polypropylene, semisynthetic fibers such as rayon, and natural fibers such as Broussonetia kazinoki and Edgeworthia chrysantha.

INDUSTRIAL APPLICABILITY

The extraction bag sheet manufacturing machine of the present invention is useful for continuously manufacturing, in a production line, tea bags for black teas, green teas, herbal teas, and other teas and extraction bags containing dried products such as dried small sardine and dried bonito for preparing stock.

The invention claimed is:

1. A method for manufacturing an extraction bag sheet, the extraction bag sheet being a water-permeable filter sheet on which tags bonded to a string are disposed at predetermined intervals in a lengthwise direction of the water-permeable filter sheet, the method comprising:
   (1) a step of placing and holding the tags on a rotary supporting body at predetermined intervals;
   (2) a threading step of threading the string into a continuous pattern by moving a threading member oscillatingly on a circumferential surface of the rotary supporting body having threading pins protruding from the circumferential surface;
   (3) a bonding step of bonding the string to the tags;
   (4) a step of supplying the water-permeable filter sheet onto the tags and the string placed on the rotary supporting body;
   (5) a bonding step of bonding the string to the water-permeable filter sheet on the rotary supporting body; and
   (6) a bonding step of bonding the tags to the water-permeable filter sheet on the rotary supporting body, wherein,
   in the bonding steps of (3), (5), and (6), bonding heads that are moved oscillatingly about a center axis of the rotary supporting body and moved vertically relative to the circumferential surface of the rotary supporting body are used, and oscillation speeds, vertical movement speeds, and press-contact time periods of the bonding heads are controlled using an oscillation servo motor and a vertical movement servo motor.

2. A machine for manufacturing an extraction bag sheet, the extraction bag sheet being a water-permeable filter sheet on which tags bonded to a string are disposed at predetermined intervals in a lengthwise direction of the water-permeable filter sheet, the machine comprising:
   (1) a tag supplying unit for supplying the tags onto a rotary supporting body such that the tags are held thereon at predetermined intervals;
   (2) a string threading unit for threading the string into a continuous pattern by moving a threading member oscillatingly on a circumferential surface of the rotary supporting body having threading pins protruding from the circumferential surface;
   (3) a bonding unit for bonding the string to the tags;
   (4) sheet supplying means for supplying the water-permeable filter sheet onto the tags and the string placed on the rotary supporting body;
   (5) a bonding unit for bonding the string to the water-permeable filter sheet on the rotary supporting body; and
   (6) a bonding unit for bonding the tags to the water-permeable filter sheet on the rotary supporting body, wherein each of the bonding units in (3), (5), and (6) includes a bonding head that is moved oscillatingly about a center axis of the rotary supporting body and moved vertically relative to the circumferential surface of the rotary supporting body, and oscillation speeds, vertical movement speeds, and press-contact time periods of the bonding heads of the bonding units in (3), (5), and (6) are controlled using an oscillation servo motor and a vertical movement servo motor.

\* \* \* \* \*